United States Patent
Bachmaier et al.

(10) Patent No.: US 12,258,983 B2
(45) Date of Patent: Mar. 25, 2025

(54) HYDRAULIC TRANSMISSION UNIT FOR AN ACTUATOR

(71) Applicant: MetisMotion GmbH, Munich (DE)

(72) Inventors: Georg Bachmaier, Munich (DE);
Matthias Gerlich, Munich (DE);
Takeru Nemoto, Munich (DE);
Wolfgang Zoels, Munich (DE)

(73) Assignee: MetisMotion GmbH, Munich (DE)

( * ) Notice: Subject to any disclaimer, the term of this patent is extended or adjusted under 35 U.S.C. 154(b) by 93 days.

(21) Appl. No.: 17/604,136

(22) PCT Filed: Apr. 17, 2019

(86) PCT No.: PCT/EP2019/059923
§ 371 (c)(1),
(2) Date: Oct. 15, 2021

(87) PCT Pub. No.: WO2020/211936
PCT Pub. Date: Oct. 22, 2020

(65) Prior Publication Data
US 2022/0205463 A1    Jun. 30, 2022

(51) Int. Cl.
*F15B 7/08* (2006.01)
*F15B 7/10* (2006.01)
(Continued)

(52) U.S. Cl.
CPC ............ *F15B 7/08* (2013.01); *F15B 7/10* (2013.01); *F15B 7/001* (2013.01); *F15B 7/003* (2013.01);
(Continued)

(58) Field of Classification Search
CPC .... F15B 7/08; F15B 7/10; F15B 7/001; F15B 7/003; F15B 7/02; F15B 2211/7107; F16D 2025/081
See application file for complete search history.

(56) References Cited

U.S. PATENT DOCUMENTS 1,830,869 A * 11/1931 Charles .................... F15B 7/10
174/12 R
2,072,693 A * 3/1937 Volkert ................. F16K 31/126
60/590
(Continued)

FOREIGN PATENT DOCUMENTS

DE    102013219759 A1    4/2015
DE    102016213654 A1    2/2018
(Continued)

OTHER PUBLICATIONS

Fluid Mechanics Pascal's Principle and Hydraulics, University Physics vol. 1, 14 Fluid Mechanics, 14.3 Pascal's Principle and Hydraulics, Openstax (Year: 2012).*
(Continued)

*Primary Examiner* — Dustin T Nguyen
(74) *Attorney, Agent, or Firm* — FITCH, EVEN, TABIN & FLANNERY LLP

(57) ABSTRACT

The invention relates to a hydraulic transmission unit for an actuator, which hydraulic transmission unit can be filled with a hydraulic fluid and has a first and a second chamber which are hydraulically interconnected and of which one is designed as a drive chamber and the other one is designed as an output chamber. At least in the first chamber, a piston is arranged movably along a piston axis, such that this piston subdivides the first chamber into a variable-volume working chamber and a rear-side chamber, the rear-side chamber being delimited at least partially by a bellows element having a variable axial length. The invention further relates to an actuator having such a hydraulic transmission unit.

17 Claims, 7 Drawing Sheets

(51) Int. Cl.
*F15B 7/00* (2006.01)
*F15B 7/02* (2006.01)
*F16D 25/08* (2006.01)

(52) U.S. Cl.
CPC ......... *F15B 7/02* (2013.01); *F15B 2211/7107* (2013.01); *F16D 2025/081* (2013.01)

(56) References Cited

U.S. PATENT DOCUMENTS

| | | | | |
|---|---|---|---|---|
| 2,246,348 | A * | 6/1941 | Coffey | F02D 11/00 60/576 |
| 2,536,628 | A * | 1/1951 | Denisoff | F15B 7/10 60/329 |
| 2,733,572 | A * | 2/1956 | Butterfield et al. | B21D 22/00 92/99 |
| 2,800,055 | A * | 7/1957 | May | B25J 7/00 359/896 |
| 3,285,061 | A * | 11/1966 | Hegenbart | F15B 7/00 177/208 |
| 3,423,937 | A * | 1/1969 | Wagstaffe | F15B 7/08 92/38 |
| 3,710,571 | A * | 1/1973 | Tracey | H01H 3/24 200/83 B |
| 3,986,434 | A * | 10/1976 | Kohler | F15B 15/06 91/461 |
| 4,372,118 | A * | 2/1983 | Andresen | F15B 7/00 60/591 |
| 4,728,317 | A * | 3/1988 | Martz | F16H 7/1236 474/136 |
| 4,946,329 | A * | 8/1990 | Krueger | B25J 9/14 60/329 |
| 5,287,700 | A * | 2/1994 | Hein | F15B 15/068 92/48 |
| 6,460,449 | B2 * | 10/2002 | Higuchi | F16D 25/088 60/570 |
| 6,572,055 | B1 * | 6/2003 | Bernard | F15B 7/008 244/234 |
| 9,488,194 | B2 * | 11/2016 | Bachmaier | F02M 61/167 |
| 10,330,125 | B2 * | 6/2019 | Bachmaier | F15B 1/26 |
| 10,545,166 | B2 * | 1/2020 | Meulblok | G01P 15/093 |
| 10,690,154 | B2 * | 6/2020 | Zöls | F15B 11/022 |
| 2013/0269790 | A1 | 10/2013 | Bachmaier et al. | |
| 2022/0200486 | A1 | 6/2022 | Bachmaier | |

FOREIGN PATENT DOCUMENTS

| | | | |
|---|---|---|---|
| DE | 102017214697 A1 | 2/2019 | |
| EP | 3490017 A1 | 5/2019 | |
| FR | 776645 * | 10/1933 | ............... F15B 7/10 |
| FR | 825344 A | 3/1938 | |
| FR | 1370931 A | 8/1964 | |
| GB | 1375990 * | 12/1971 | ............... F15B 7/00 |
| WO | 2011150913 A1 | 12/2011 | |
| WO | 2012034823 A1 | 3/2012 | |
| WO | 2020211937 A1 | 10/2020 | |

OTHER PUBLICATIONS

PCT; App No. PCT/EP2019/059923; International Search Report and Written Opinion mailed Jan. 8, 2020.

Examination Report from EPO Application No. 19 722 524.6; dated Oct. 24, 2023; In German with English Translation (14 pages).

* cited by examiner

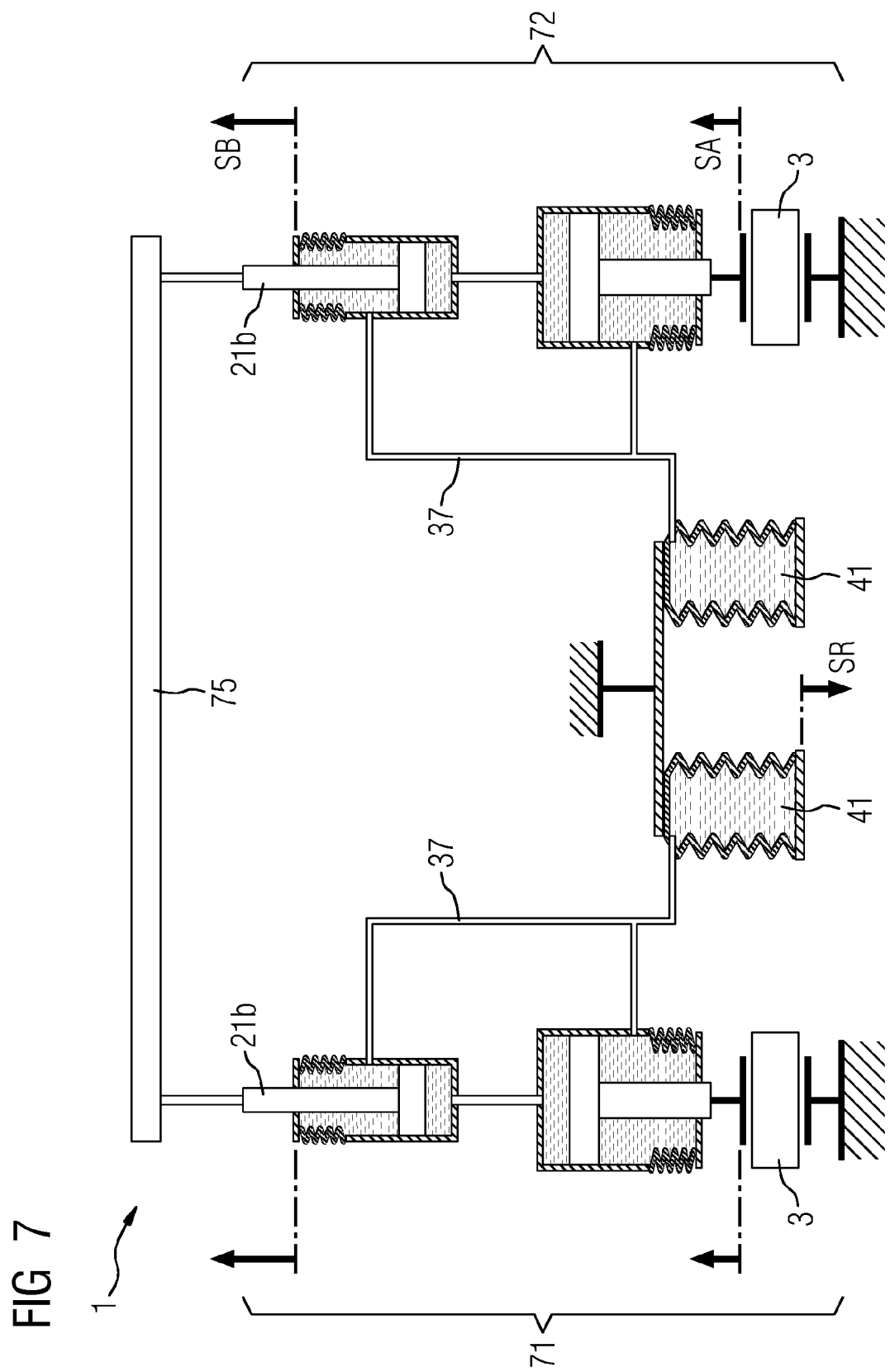

HYDRAULIC TRANSMISSION UNIT FOR AN ACTUATOR

CROSS-REFERENCE TO RELATED APPLICATIONS

This application is a U.S. national phase application of International Application No. PCT/EP2019/059923, filed Apr. 17, 2019, designating the United States.

FIELD

The present invention relates to a hydraulic transmission unit for an actuator device, which hydraulic transmission unit can be filled with a hydraulic fluid and comprises a first and a second chamber, which are hydraulically connected to each other and of which one is formed as a drive chamber and the other is formed as an output chamber. Furthermore, the invention relates to an actuator device with such a hydraulic transmission unit.

BACKGROUND

From the prior art, especially piezo-hydraulic actuators are known, which typically include a piezo actuator and a hydraulic transmission unit, wherein the piezo actuator acts as a drive for the hydraulic transmission unit. An essential feature of such combined actuator devices is that by the presence of a hydraulic unit, a substantially larger mechanical stroke can be achieved than with the piezo actuator alone. For example, this can be achieved by a transmission ratio in the hydraulic unit and/or by a pumping effect in the hydraulic unit, which effects a summation of the effect of numerous small single movements of the piezo actuator. Hereby, a principal disadvantage of the piezo actuator and also of other known solid-state actuators is overcome, namely the low stroke thereof. Such piezo-hydraulic actuators are for example known from the published patent applications DE 102016213654 A1 and DE 102013219759.

The known hydraulic transmission units are typically realized either as piston systems or as bellows systems. Independently of the exact design, they comprise a drive chamber and an output chamber in any case, which are hydraulically connected to each other. In a piston system, the drive chamber then comprises a drive piston movable in it, and the output chamber comprises an output piston movable in it. The two chambers are fluidically coupled such that a movement of the drive piston can effect a movement of the output piston. Therein, a desired transmission ratio for the two movements can be achieved depending on the area ratio of the two pistons. Thus, a relatively low stroke of a piezo actuator can in particular be increased to a value required for a certain application by the hydraulic transmission unit mechanically connected in series.

It is problematic in such a piston system that the sealing of the working volume against the outer environment in the region of the movable piston is relatively difficult. In order that the piston is movable within the concerned chamber, a certain gap has to be present between the piston and the surrounding cylinder wall. Hydraulic fluid can exit through this gap. On the one hand, this can result in the fact that the hydraulic parameters vary in undesired manner in extended operation of the transmission device. On the other hand, this can also result in an undesired contamination of the environment with the hydraulic fluid.

Alternatively, the hydraulic transmission unit can be realized as a bellows system. Here, the two chambers are not delimited by movable pistons, but by bellows-like shaped outer walls. For example, the sidewalls of the chambers can be formed by so-called corrugated bellows, whereby a variable volume respectively arises in the chambers. By the fluidic coupling of the two chambers, here, a compression in the one chamber also effects an expansion in the other chamber and vice versa. Here too, a desired path-transmission ratio can be adjusted by the selection of a certain ratio between the cross-sectional areas of the two corrugated bellows.

An advantage of such a bellows system with respect to the described piston system is in that the corrugated bellows can be fluid-tightly designed and thus an exit of hydraulic fluid from the system can be avoided. However, such a bellows system also has multiple disadvantages: The region between the bellows corrugations often has a comparatively high portion of the fluid volume of the chamber, which reduces the fluidic stiffness and thus the dynamics of the transmission unit. In addition, a wall formed as a corrugated bellows also always has a limited stiffness in lateral direction (thus perpendicular to the principal direction of movement in the deformation of the bellows). This too results in lower dynamics of the transmission. A further disadvantage is that in case of the possibility of high pressure peaks in the concerned chamber, the bellows has to be designed with a sufficiently high wall thickness and a correspondingly high mechanical stiffness. This results in comparatively high mechanical losses in the transmission unit.

Therefore, it is the object of the invention to specify a hydraulic transmission unit, which overcomes the mentioned disadvantages. In particular, a transmission unit is to be provided, which has high tightness for the hydraulic fluid and which has particularly high dynamics and low energy losses at the same time in the operation. A further object is in specifying an actuator device with such a hydraulic transmission unit.

SUMMARY

These objects are solved by the hydraulic transmission unit described in claim 1 and the actuator device described in claim 14.

The hydraulic transmission unit according to the invention is configured as a transmission unit for an actuator device. It can be filled with hydraulic fluid and it comprises a first and a second chamber, which are hydraulically connected to each other. Of the two chambers, one is formed as a drive chamber and the other is formed as an output chamber. At least in the first chamber, a piston is arranged movably along a piston axis such that this piston separates the first chamber in a variable-volume working chamber and a rear-side chamber. The rear-side chamber is at least partially delimited by a bellows element with variable axial length.

The described first chamber with the mentioned further characteristics can be either the drive chamber or the output chamber of the transmission unit. Basically, both chambers can also be configured with the described features. In such a case, the advantages described in the following and also the described advantageous implementation variants correspondingly apply to both chambers.

A local axial direction is defined by the direction of movement of the piston for the respective chamber. In the following, the term "axial" always refers to the local direction of the piston axis in the respective chamber. Therein, the axial directions of the individual chambers can be selected either the same or optionally also different. In the following, the term "lateral" always relates to a direction perpendicular to the respective axial direction.

In the configuration of the first chamber according to the invention, it is separated into a working chamber and a rear-side chamber by the piston. Therein, the position and thus the ratio of the subdivision can be varied by the movement of the piston. The side of the piston, which faces the working chamber, is referred to as front side of the piston in the following. Correspondingly, the rear-side chamber is in the region of the rear side of the piston. The working chamber of the first chamber is in particular fluidically coupled to a corresponding working chamber of the second chamber such that volumetric variations in the two working chambers can compensate for each other by a corresponding flow of hydraulic fluid. In this manner, a movement of a drive body arranged in the region of the drive chamber can be transmitted into a corresponding movement of an output body arranged in the region of the output chamber.

The rear-side chamber is at least partially delimited by a bellows element: In other words, at least a part of the wall of the rear-side chamber is formed as a bellows-like deformable wall. This bellows element is to have a variable axial length: In other words, the bellows element is to be configured such that the length of the rear-side chamber in axial direction can be adapted. Hereby, a length compensation can advantageously be achieved, which in particular can compensate for a variation of the axial length of the rear-side chamber effected by the movement of the piston. Thus, the length variation effected by the movement of the piston can be either partially or even completely compensated for. By this length compensation, a volumetric compensation for the volume of the rear-side chamber can in particular also be effected. Conveniently, the volume of the rear-side chamber can be kept substantially constant upon a movement of the piston by the described effect of the bellows element. As will be set forth in more detail below, however, the volume does not have to be completely constant. In context of the present invention, it is only essential that the bellows element experiences a length variation upon a movement of the piston and that this length variation is suitable to counteract a volumetric variation of the rear-side chamber caused by the piston movement. Therein, the volumetric variation of the rear-side chamber caused by the piston movement can basically be either partially or completely compensated for or even overcompensated for.

An essential advantage of the transmission unit according to the invention compared to conventional pure piston systems is in that a substantially complete tightness for the hydraulic fluid is overall achieved by the encapsulated configuration of the rear-side chamber in the region of the rear side of the piston. Even if a slight leakage between working chamber and rear-side chamber occurs in the movement of the piston, thus, a loss of hydraulic fluid to the outer environment can nevertheless be avoided by the encapsulation of the rear-side chamber. Furthermore, such a leakage between the chambers, which occurs with a given direction of movement, can be at least partially again undone by a subsequent rearward movement. Thus, the disadvantages associated with the leakage susceptibility of the conventional piston systems are avoided.

An essential advantage of the transmission unit according to the invention compared to conventional pure bellows systems is in that a high stiffness and thus high dynamics for the movement transfer between drive side and output side can be substantially easier achieved. In the present context, a fast temporal response behavior is to be understood by "high dynamics" of the transmission unit. In other words, "high dynamics" is to mean that a short, fast movement on the drive side is transmitted into a correspondingly short, fast movement on the output side with low time offset and low temporal extension.

Such high dynamics can be easily realized in the described transmission unit especially in that the working volume can overall be kept low. Therein, the working volume corresponds to the entire volume of hydraulic fluid, which is available for transferring a movement by means of the transmission unit. For example, this working volume can be composed of the volumes of the two working chambers facing each other (on the drive and the output side) as well as the volume portions of the connecting line(s) as well as optional additional reservoir chambers fluidically connected thereto. The lower this working volume can be kept, the stiffer and more dynamically the transmission unit behaves. In context of the present invention, it is advantageous that the bellows element is only employed in the region of the rear-side chamber and thus the regions between the bellows corrugations do not contribute to the described working volume. Thus, bellows elements conveniently are not present at all as delimiting elements in the region of the actual working volume. Hereby, a high stiffness for transfer is also achieved because the deformable (always also in lateral direction) bellows element only results in a deformation of the rear-side chamber. In contrast, an undesired lateral deformability in the region of the working volume is avoided.

Thus, a transmission with high dynamics, high stiffness (and thereby low energy losses) with high tightness with respect to the hydraulic fluid at the same time is overall allowed by the described transmission unit.

The actuator device according to the invention comprises an actuator and a hydraulic transmission unit mechanically connected in series with the actuator. In particular, the actuator is mechanically connected to the transmission unit on the drive side. In this manner, a movement of the actuator can be transmitted into a corresponding mechanical movement on the output side by means of the hydraulic transmission unit. Therein, both the stroke of the movement and the transferred force are correspondingly varied by the transmission ratio realized in the transmission unit. The advantages of the actuator device according to the invention further correspond to the above descried advantages of the transmission unit according to the invention.

Advantageous configurations and developments of the invention are apparent from the claims dependent on claims 1 and 14 as well as the following description. Therein, the described configurations of the transmission unit and of the actuator device generally can be advantageously combined with each other.

Thus, the piston of the first chamber can comprise a piston body and a piston pin. Furthermore, the associated rear-side chamber can comprise an end plate in its axial end region facing away from the piston body, though which the piston pin protrudes into the rear-side chamber and to which the piston pin is fixedly connected.

Therein, it is in particular to be understood by the term "fixedly connected" that the piston pin and the end plate cannot be moved relatively to each other in axial direction. Optionally, they can also be fixed against each other with respect to the remaining spatial directions. The actual separation of the first chamber into a working chamber and a rear-side chamber is thus effected by the piston body. In contrast, the piston pin effects the force transfer—thus either the transfer of a force from an external element to the transmission unit on the drive side or the transfer of a force from the transmission unit to an external element on the output side. The side of the first chamber, on which the described end plate is arranged, is also referred to as face side. In order to allow a force transfer between the piston and the external element in the region of this face side, the piston pin protrudes through the end plate. Since the bellows element described above allows a length compensation of the rear-side chamber, the piston pin can nevertheless be fixedly connected to the end plate. An essential advantage of such a fixed connection is that it can be formed in fluid-tight manner for the used hydraulic fluid. For example, piston pin and end plate can be connected to each other in force-fit and/or form-fit manner. In particular, they can be welded and/or adhered to each other.

Generally advantageously, the first chamber can be configured such that upon a movement of the piston along the piston axis, a volume compensation is effected by the bellows element for the volume of the rear-side chamber. In particular, the first chamber can be configured such that a movement of the piston can be substantially volumetrically neutrally effected for the rear-side chamber. Here, it is for example to be understood by "substantially volumetrically neutrally" that the volume of the rear-side chamber varies by not more than 10% upon a piston movement in the preset working region. Particularly advantageously, such a volumetric variation can be limited to at most 5%. In order to achieve this, the rear-side chamber can in particular be configured as a whole such that the hydraulic area of the movable piston effective in the rear-side chamber substantially corresponds to the effective hydraulic area of the bellows element. Then, a volumetric variation of the rear-side chamber effected by the piston movement can substantially be compensated for by a corresponding, opposite volumetric variation of the bellows element.

Since the movement of the piston can be performed only nearly volumetrically neutrally and not exactly volumetrically neutrally in practice, an additional volumetric compensation can optionally be provided for the rear-side chamber. Hereto, a line can for example be provided, which fluidically connects the rear-side chamber of the first chamber to a corresponding rear-side chamber of the second chamber. This is especially convenient in embodiments, in which the second chamber is overall formed similarly as the first chamber and is provided with a second rear-side chamber, delimited by a bellows element, in analogous manner. Such a mutual compensation between drive side and output side can in particular be sufficient if the hydraulic area ratio of the two bellows elements (on drive and output side) substantially corresponds to the hydraulic area ratio of the two piston elements (on drive and output side).

However, alternatively or additionally, the first rear-side chamber can also be fluidically connected to a reservoir chamber for the hydraulic fluid. In particular, this can be advantageous if the area ratio is not sufficiently accurately adapted in case of a fluidic coupling of two rear-side chambers.

Generally advantageously, the rear-side chamber can be fluid-tightly encapsulated against the outer environment. In particular, the rear-side chamber can be sealed with respect to the used hydraulic fluid. Hereby, a fluid exchange with the outer environment is advantageously prevented even in case of a leakage between working chamber and rear-side chamber.

For example, the bellows element can be configured as a corrugated bellows and/or as a diaphragm bellows. Thus, it can in particular be formed as an annular sidewall with a corrugation-like profile. The corrugation-like profile can in particular have a regular sequence of a plurality of corrugations. Such an annular sidewall can advantageously be formed by a correspondingly corrugated or undulated elastically deformable (but fluid-tight) diaphragm. Generally and independently of the exact geometric configuration, the bellows element can advantageously be formed of a metallic material or at least include such a metallic material.

Since the described bellows element is only required for a volumetric compensation of the rear-side chamber, it can advantageously be designed with a substantially lower wall thickness and a substantially lower stiffness as if the bellows itself would form the stroke element of the working chamber. Compared to a pure bellows system according to the prior art, thus, a comparatively low wall thickness of the bellows element can in particular be selected. Hereby, the mechanical losses arising by the movement of the bellows element are also advantageously reduced.

According to a preferred embodiment, the first chamber can be laterally delimited by a cylinder wall, wherein the associated piston is arranged axially movably in relation to the cylinder wall. Therein, the direction of movement of the piston corresponds to the cylinder axis. Advantageously, a gap with a gap width in the range below 10 µm and in particular between 0.5 µm and 10 µm can be formed between the cylinder wall and the piston. Upon a movement of the piston, a low amount of hydraulic fluid can be moved between the working chamber and the rear-side chamber through the slight lateral gap. A gap width in the described range is sufficiently high to be able to move the piston in axial direction in low-friction manner on the one hand. On the other hand, the gap width is sufficiently low to keep the passing fluid volume low. This is advantageous in order to keep a pressure loss (or an undesired pressure increase) in the region of the working chamber as low as possible, which in turn overall minimizes the mechanical losses and improves the stiffness and dynamics of the movement transfer. However, the gap width is principally not downwards limited since transition adaptions are also possible in honing. The shape of the cylinder wall can in particular be circularly cylindrical. However, this is not necessarily required and straight cylinders with other cross-sectional geometries can basically also be employed.

Generally advantageously, the described cylinder gap can be formed without seal. In other words, the piston is then moved in relation to the surrounding cylinder wall without an additional sealing element. In this embodiment, thus, besides the actual material of the piston body, an additional sealing element of a different material is not to be present between the piston body and the cylinder wall.

Generally, the hydraulic transmission unit can be filled with a hydraulic fluid. In this embodiment, thus, the hydraulic fluid is already part of the transmission unit. For realizing the invention, however, it is basically sufficient if the transmission unit comprises a chamber system suitable for filling with the hydraulic fluid. For example, a suitable hydraulic fluid is a silicone oil, a glycol or else a liquid metal. When the transmission unit is filled with the hydraulic fluid, it is found both in the drive chamber and in the output chamber (and therein optionally respectively both in the working chamber and in the rear-side chamber) and additionally in one or more optionally present connecting lines and/or reservoir chambers. Generally, drive chamber and output chamber can either be fluidically connected by a line or else directly transition into each other as partial regions of a superordinated chamber volume.

Generally advantageously, the transmission unit can additionally comprise a reservoir chamber for the hydraulic fluid, which is fluidically coupled and/or capable of being fluidically coupled to the at least one rear-side chamber. This embodiment can be especially advantageous if a movement of the piston is not completely volumetrically neutral for the rear-side chamber. Thus, a small volumetric variation of the rear-side chamber can be advantageously compensated for by a fluidic coupling to the reservoir chamber. However, alternatively or additionally, a coupling to a reservoir chamber can also be useful to compensate for a volumetric variation of hydraulic fluid caused by a temperature variation. In a particularly preferred variant of this embodiment, the reservoir chamber can be applied with pressure. Such a possibility of pressure application can for example be realized by an additional bellows element, a preloaded spring and/or a piston in the region of the reservoir chamber. Via this, the reservoir chamber can be applied with a pressure, which can first for example be higher or lower than the pressure in the rear-side chamber fluidically coupled to the reservoir chamber. Thus, the entire hydraulic system can be preloaded to a desired initial pressure for example by means of an actuating element present in the region of the reservoir chamber, whereby a desired initial position of an output body present on the output side can in particular be adjusted. Therein, the respectively arising initial position of the output body depends on the stiffnesses of the employed bellows elements as well as the preload forces acting on the actuating body and the output body.

According to an advantageous embodiment, the transmission unit can be formed as a pumpable transmission unit such that a summed movement can be generated in the region of the output chamber by multiple consecutive single movements in the region of the drive chamber. Such a pumping effect is for example described in DE 102017214697 A1 and in the European patent application with the file number 17203689.9. In such an embodiment, there is effected not only a transmission, but also summation of the single movements of a drive body to a summed overall movement of an output body. Hereto, one or more check valves can for example be provided in the hydraulic line between the drive-side working chamber and the output-side working chamber. Optionally, one or more pumping reservoirs for the hydraulic fluid can additionally be provided, which can be hydraulically coupled to the working volume.

According to an advantageous implementation variant, the transmission unit can be formed to transfer a movement of a drive body arranged in the region of the drive chamber to an output body arranged in the region of the output chamber with a transmission ratio of less than 1. With a transmission ratio below 1, the stroke on the output side is larger than the stroke on the drive side. Thus, the ratio of the stroke on the drive side to the stroke on the output side of the respective transmission device is generally to be understood by the transmission ratio mentioned here. With an increasing stroke, this transmission ratio is correspondingly less than 1. In this manner, thus, a larger stroke can be achieved on the output side than the stroke initiating the movement on the drive side. In this manner, in particular in an actuator device with a solid-state actuator, the disadvantage of the comparatively low primary stroke of the solid-state actuator can be compensated for. Particularly advantageously, the hydraulic transmission unit can generally have a transmission ratio of 1:2 or less. Thus, with a transmission ratio below 1:2, an even higher than the 2-fold stroke increase is obtained. In other words, the stroke is then at least doubled on the output side in relation to the stroke on the drive side. Particularly advantageously, the transmission ratio can be in the range between 1:10 and 1:2.

However, according to an alternative advantageous implementation variant, the transmission unit can also be formed to transfer a movement of a drive body arranged in the region of the drive chamber to an output body arranged in the region of the output chamber with a transmission ratio of more than 1. In this manner, a greater force can act on the output side than the force, which is available on the drive side (with a decrease of the stroke). This implementation variant is thus generally advantageous for applications, in which high forces are required. Particularly advantageously, the transmission ratio of the hydraulic transmission unit can generally be greater than 2 and in particular be in the range between 2 and 10.

In order to adjust a desired transmission ratio, the hydraulic areas of the pistons in the drive chamber and the output chamber are conveniently dimensioned in a corresponding ratio.

According to a particularly preferred embodiment, a second piston is arranged movably along a piston axis also in the second chamber of the transmission unit such that this second piston separates the second chamber into a variable-volume second working chamber and a second rear-side chamber, wherein the second rear-side chamber is at least partially delimited by a second bellows element with variable axial length. In this embodiment particularly to be preferred, thus, both the drive chamber and the output chamber are designed in the previously described manner. Hereby, the advantages described above with respect to the fluid-tight encapsulation, the high stiffness and high dynamics for the entire transmission unit particularly efficiently take effect. In this "double-sided" embodiment, all of the remaining advantageous configurations can in particular also be correspondingly realized on both sides of the transmission unit—thus respectively both on the drive side and on the output side.

Generally advantageously, the entire working volume of the hydraulic transmission unit can be 1 ml or less. In particular, the working volume can be in the range below 0.5 ml or even below 0.1 ml and in particular between 0.01 ml and 0.5 ml or between 0.01 ml and 0.1 ml. With such a low working volume, a transmission unit with high stiffness and/or high dynamics can be particularly easily realized.

Advantageously, the entire working volume can be lower than the entire rear-side volume. Herein, this rear-side volume is composed of the volumes of optionally both present rear-side chambers as well as optionally one or more lines fluidically coupled to them and/or reservoir chambers.

According to a preferred embodiment of the actuator device, the actuator connected in series with the hydraulic transmission unit is a solid-state actuator. With such a solid-state actuator, the described advantages of the transmission unit according to the invention particularly efficiently take effect since in particular the stroke of a solid-state actuator is severely limited in practice and high stiffnesses are advantageous for power transfer depending on the actuator type. Thus, a solid-state actuator typically has a high characteristic frequency and thereby advantageously high dynamics.

According to a particularly preferred variant, the solid-state actuator is a piezo actuator. Piezo actuators have proven to be particularly promising configurations of the solid-state actuator in a hydraulic actuator device in the past. A particularly precise movement can be achieved with them. Their principal disadvantage, namely their low mechanical stroke, can be compensated for by the following hydraulic unit as described.

Particularly preferably, the piezo actuator of the actuator device is formed as a piezo stack actuator. A piezo stack actuator is a series connection of multiple individual piezo elements basically known from the prior art, which are arranged as a layer stack. Such a stack actuator is particularly advantageous to achieve a higher movement amplitude already with the piezo actuator than it would be possible with a single piezo element.

However, the invention is not restricted to a piezo actuator as a solid-state actuator. Thus, many of the known advantages and disadvantages of piezo actuators also apply to other types of solid-state actuators. For them too, a comparatively low initial stroke can be increased by the following hydraulic transmission unit. According to a preferred implementation variant, the mentioned solid-state actuator is for example a magnetostrictive actuator or an electrostrictive actuator. Alternatively, the solid-state actuator can also be a shape memory actuator.

According to a further advantageous embodiment of the actuator device, it can comprise two or more partial systems, wherein each partial system comprises an actuator and a hydraulic transmission unit mechanically connected in series with the actuator. Advantageously, the individual transmission units are coupled or can be coupled to a common superordinated output element in the region of their respective output chambers such that a simultaneous control (acting in the same direction) of the individual actuators results in a common movement of the output element by means of the individual transmission units. By such a doubling or multiplication of the actuators and hydraulic transmission units and by their mechanical parallel connection, it can in particular be effected that a correspondingly higher energy is available for the movement of the output body. A symmetric, similar configuration of the individual partial systems is particularly advantageous, whereby approximately a doubling or multiplication of the available energy can be achieved. In particular with a mirror-symmetric arrangement of two partial systems, therein, an approximate doubling of the energy with a straight, smooth movement of the output body can advantageously be achieved since cants are advantageously avoided. The mechanical coupling to a common output body can be effected either by direct connection or else indirectly via an optional further mechanical transmission unit. The coupling to the common output body can also be indirectly effected via two or more individual further mechanical transmission units mechanically connected in parallel such that the individual parallel overall systems thus are mechanically connected only after this additional transmission stage. Particularly advantageous configurations of such a system are described in more detail in the international application filed at the same date of filing by Siemens AG with the title "stroke transmitter for an actuator device", which is therefore to be incorporated in the disclosure content of the present application.

BRIEF DESCRIPTION OF THE DRAWINGS

Below, the invention is described based on some preferred embodiments with reference to the appended drawings, in which:

FIG. 7 shows a schematic representation of an actuator device according to a third embodiment of the invention.

In the figures, identical or functionally identical elements are provided with the same reference characters.

DESCRIPTION OF THE PREFERRED EMBODIMENTS

Figure 1:
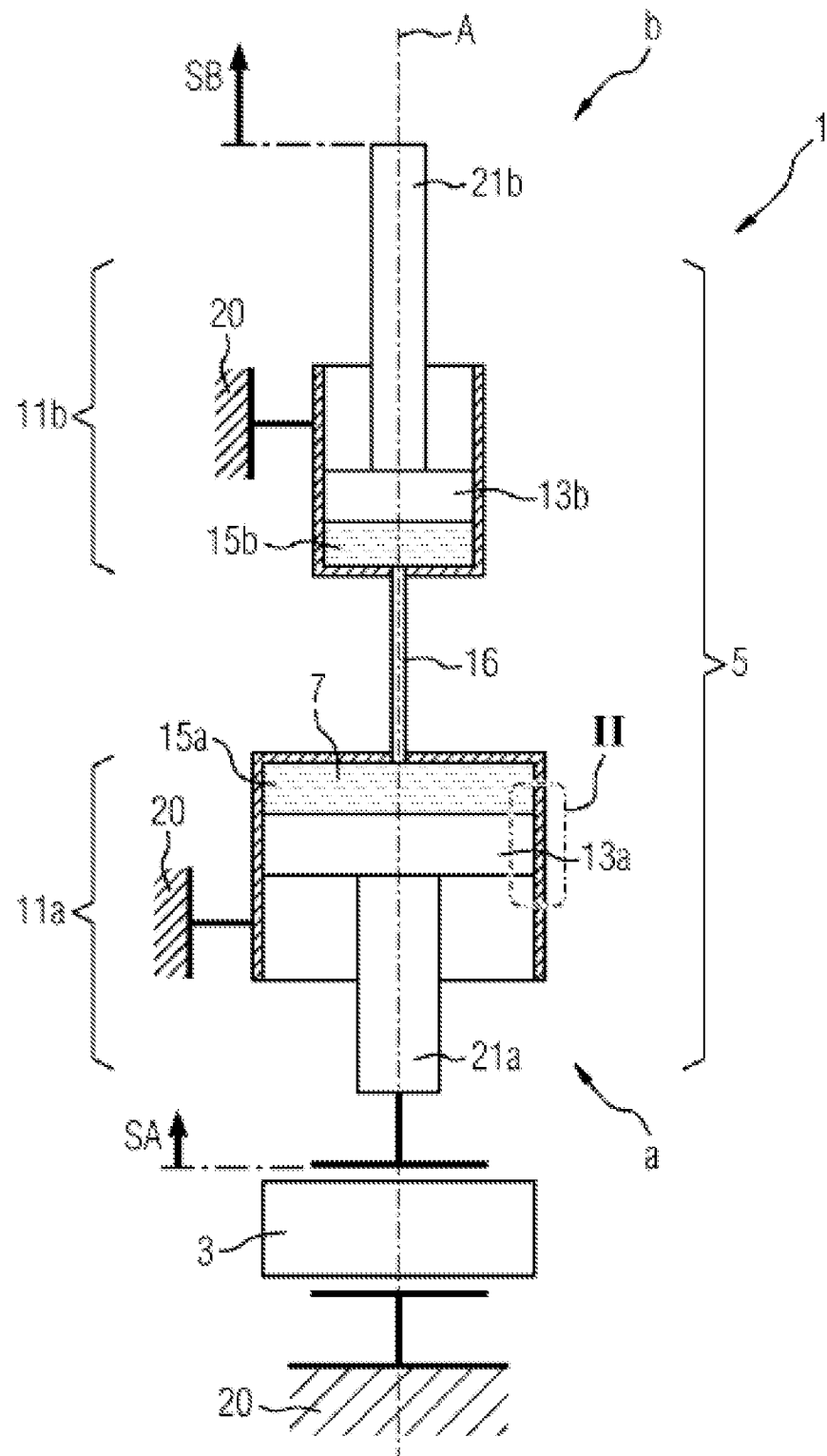
FIG. 1 shows a schematic representation of an actuator device with a piston system according to the prior art.

In FIG. 1, an actuator device 1 according to the prior art is shown in a schematic longitudinal section. The actuator device comprises an actuator 3 and a hydraulic transmission unit 5 mechanically connected in series with the actuator. Correspondingly, the side a of the transmission unit illustrated at the bottom in the image can be referred to as the drive side thereof and the side b illustrated at the top in the image can be referred to as the output side thereof. A mechanical stroke SA of a drive body 21a can be generated with the actuator 3 on the drive side a. By the hydraulic transmission unit 5, this stroke SA can be transmitted into a stroke SB of the output body 21b on the output side b thereof. The ratio between the stroke SB and the stroke SA corresponds to the transmission ratio of the hydraulic transmission unit 5. Principally, it can be greater than, equal to or also less than 1.

The transmission unit 5 of FIG. 1 comprises two chambers, a drive chamber 11a and an output chamber 11b. A first working chamber 15a is provided as a part of the drive chamber 11a, and a second working chamber 15b is provided as a part of the output chamber 11b. These two working chambers are filled with a hydraulic fluid 7 and hydraulically coupled to each other via a hydraulic line 16. Thus, an overall working volume for the hydraulic fluid results, which is composed of the two working chambers and the hydraulic line. In order to convey hydraulic fluid back and forth between the two working chambers in the operation of the transmission unit 5, two pistons are provided, namely a first piston 13a (as a drive piston) and a second piston 13b (as an output piston). The first piston 13a comprises a piston pin, which here forms the drive body 21a. The transmission ratio of the transmission unit 5 is determined by the ratio of the hydraulic areas of the two pistons 13a and 13b (more precisely by the ratio of the corresponding piston bodies). Namely, the respective area is linearly included in the volumetric variation, which arises upon a corresponding axial movement of the respective piston. Since the entire working volume is constant, an axial movement of the drive piston 13a results in a correspondingly increased or decreased axial movement of the output piston 13b. In the shown example, the area of the output piston 13b is comparatively smaller such that a correspondingly increased stroke SB results on the output side b, as is here indicated by the larger length of the arrow. Here, a movement along the local longitudinal axis A is respectively to be understood by the mentioned axial direction of movement of the pistons. In the example of FIG. 1, this axis for the two pistons coincides to a common longitudinal axis A (but which is not necessarily required in other embodiments). The mechanical mass is symbolically represented at various locations and respectively denoted by 20.

Figure 2:
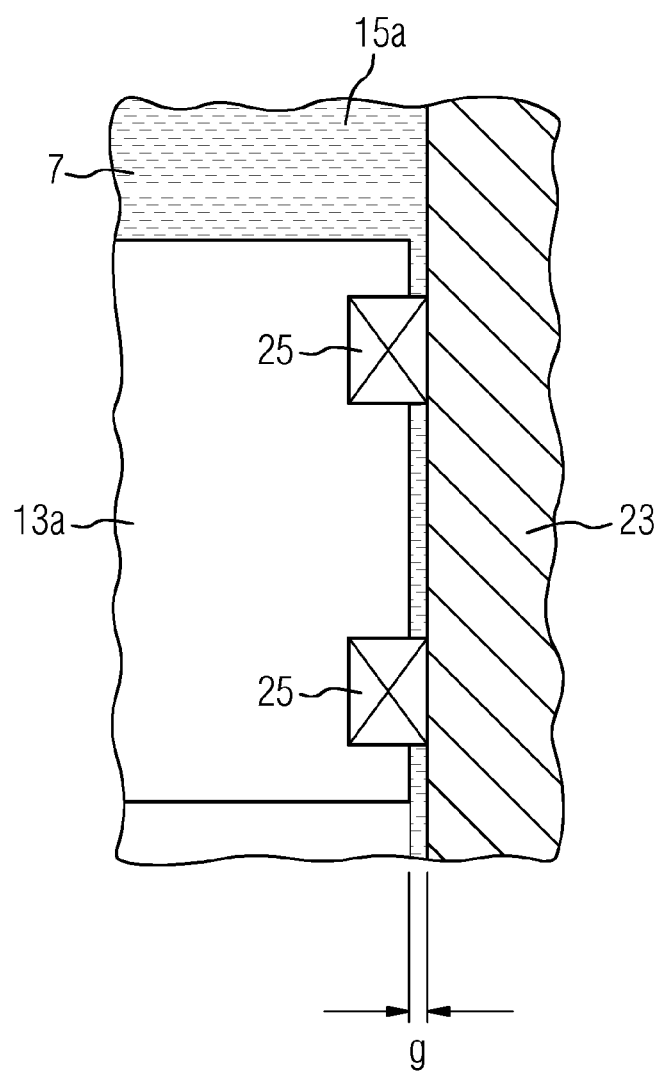
FIG. 2 shows a detailed view of a possible variant of a piston from FIG. 1.

As already described above, an essential disadvantage of such a piston system is in that the sealing of the two working chambers 15a and 15b against the two movable pistons 13a and 13b is difficult. The difficulty of the fluidic sealing is illustrated in more detail by FIG. 2. FIG. 2 shows a detailed view for a possible variant of the drive piston 13a of FIG. 1. The region marked by a dashed oval is approximately shown in FIG. 1. This is the region, in which the drive piston 13a slides past a cylinder wall 23 in axial direction, which delimits the drive chamber towards the outside in lateral direction. In the axial movement, the hydraulic fluid 7 is to remain within the first working chamber 15a as possible and not to get into the (often exposed) region of the piston rear side through the piston gap. The gap width of the piston gap is denoted by g in FIG. 2. This gap width cannot be arbitrarily small chosen in order that the piston 13a can be well moved within the cylinder wall 23 in axial direction. In the transmission unit of FIG. 2, however, it is locally decreased in that two additional sealing elements 25 are interposed between the piston 13a and the cylinder wall. Such sealing elements can help reducing an undesired leakage of the hydraulic fluid into the outer environment. However, they often result in an impairment in the linearity and/or in the dynamics of the transmission unit since a continuous change between static friction states and dynamic friction states between the piston 13a and the cylinder wall 23 occur in the operation. Therefore, it is advantageous to avoid such additional sealing elements 25 whenever possible.

Figure 3:
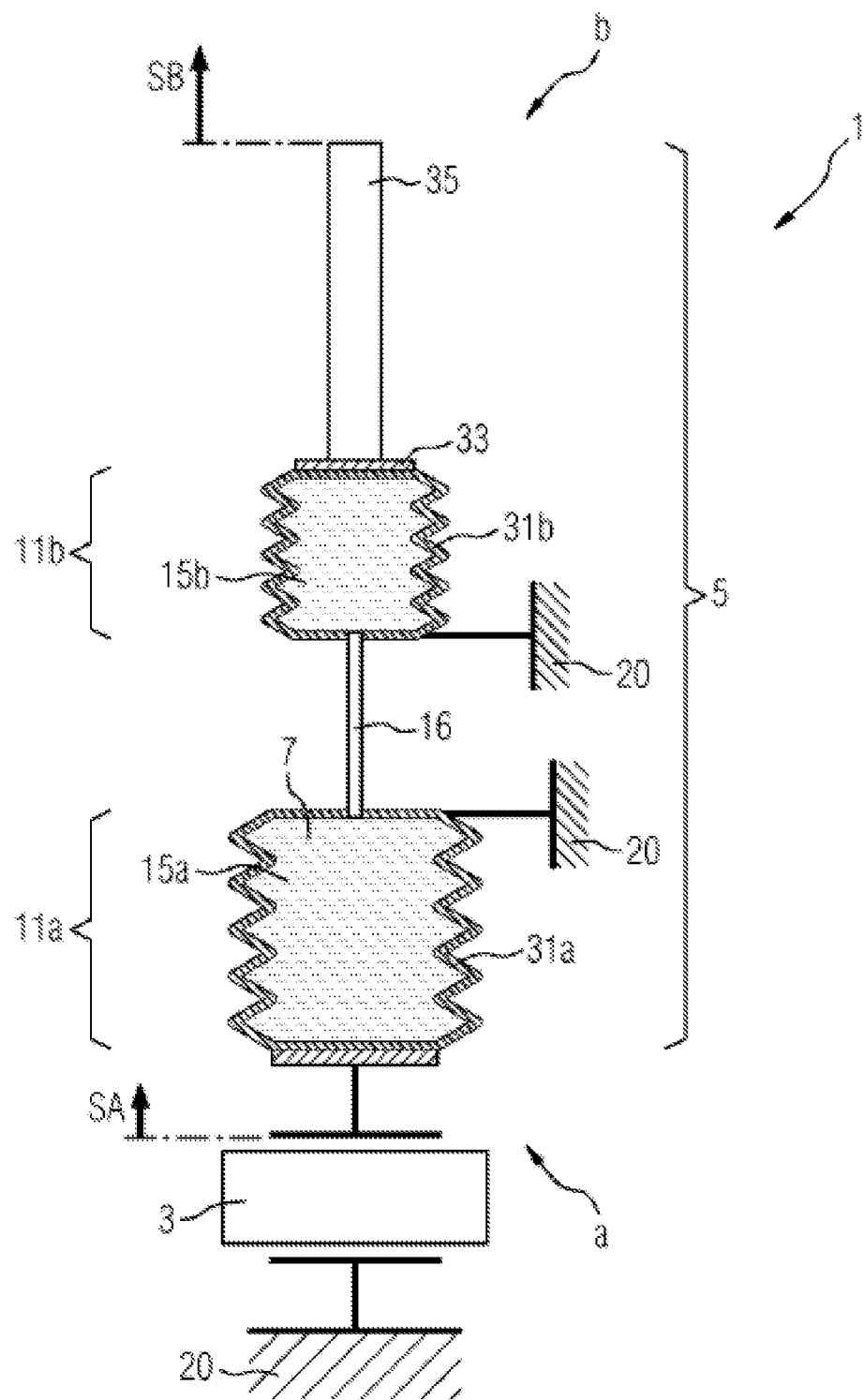
FIG. 3 shows a schematic representation of an actuator device with a bellows system according to the prior art.

FIG. 3 shows a schematic representation of a further actuator device 1 according to the prior art. Here too, an actuator 3 is arranged mechanically in series with a hydraulic transmission unit 5. Here too, the hydraulic transmission unit comprises a drive chamber 11a and an output chamber 11b, wherein the two working volumes of these chambers are coupled by a hydraulic line 16. In contrast to the preceding variant, here, the two working chambers 15a and 15b are delimited by two associated bellows elements, namely a drive bellows 31a and an output bellows 31b. These two drive bellows replace the two pistons from the transmission unit of FIG. 1 concerning their function. Correspondingly, the actuator 3 is coupled to an end plate of the drive bellows 31a on the drive side a. A corresponding stroke SA results in an extension or compression of the drive bellows and thus in a volumetric variation of the first working chamber 15a. By the fluidic coupling, this results in a corresponding volumetric variation in the second working chamber 15b. This results in a corresponding extension or compression of the output bellows 31b and thus in a stroke SB on the output side b, which can be transferred to an output body 35.

In such a bellows system, the risk of the leakage of the hydraulic fluid 7 is considerably reduced. However, the disadvantages described above arise, especially with respect to the reduced stiffness and dynamics of the system. Here, a temperature compensation either is not possible. Therefore, the pressure in the overall system rises upon a temperature increase.

Figure 4:
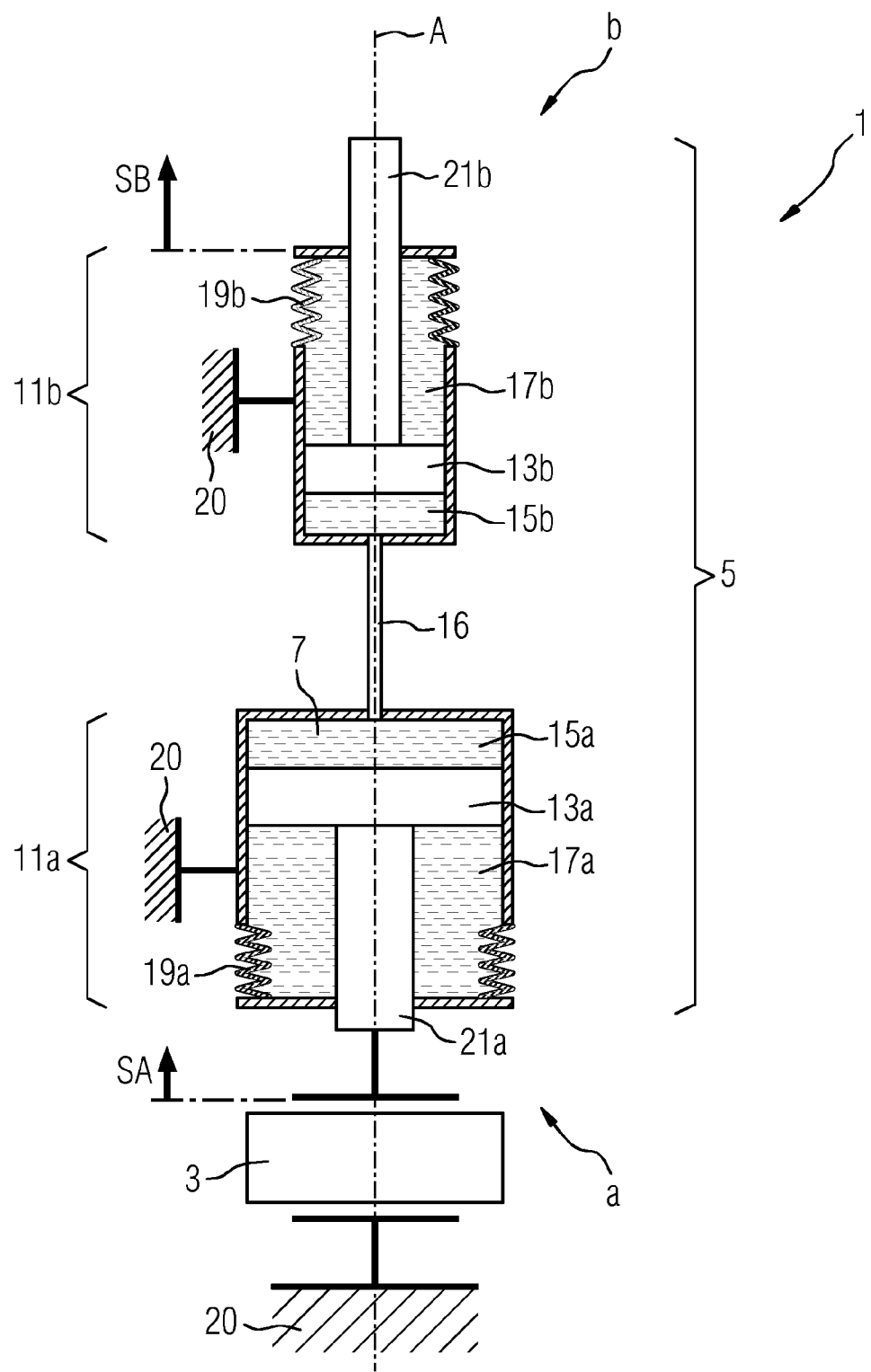
FIG. 4 shows a schematic representation of an actuator device according to a first embodiment of the invention.

In FIG. 4, a schematic representation of an actuator device 1 according to a first embodiment of the invention is shown. This actuator device 1 too comprises an actuator 3 and a hydraulic transmission unit 5 mechanically arranged in series therewith. The basic operating principle of this transmission unit 5 according to the invention is similar as in the transmission unit of FIG. 1: Here too, the stroke SA is transmitted from a drive side a into a stroke SB on the output side b by the hydraulically coupled cooperation of two pistons 13a and 13b. Here too, the transmission ratio is determined by the ratio of the hydraulic areas of the two piston bodies. Here too, the first working chamber 15a forms a partial region of the drive chamber 11a variable by the piston movement, and the second working chamber 15b forms a partial region of the output chamber 11b variable by the piston movement there.

In contrast to the transmission unit of FIG. 1, however, the rear-side volumes of the two chambers 11a and 11b are designed encapsulated here. In other words, each of the two chambers 11a and 11b, respectively, is separated into a working chamber 15a and 15b, respectively, and a rear-side chamber 17a and 17b, respectively, by the piston. Therein, the two rear-side chambers are each fluidically encapsulated against the outer environment. They are each at least partially delimited by a bellows element 19a and 19b, respectively, with variable axial length. In the shown example, a part of the sidewall of the concerned rear-side chamber is respectively formed by such a bellows. This bellows allows that the rear-side chamber can be encapsulated and that a volumetric compensation can nevertheless take place upon the movement of the respective piston. In the example of FIG. 4, both the drive chamber 11a and the output chamber 11b are realized by such a flexibly encapsulated rear-side chamber. However, within the scope of the present invention, it is principally sufficient if at least one of the two chambers 11a or 11b is configured in the described manner.

Figure 5:
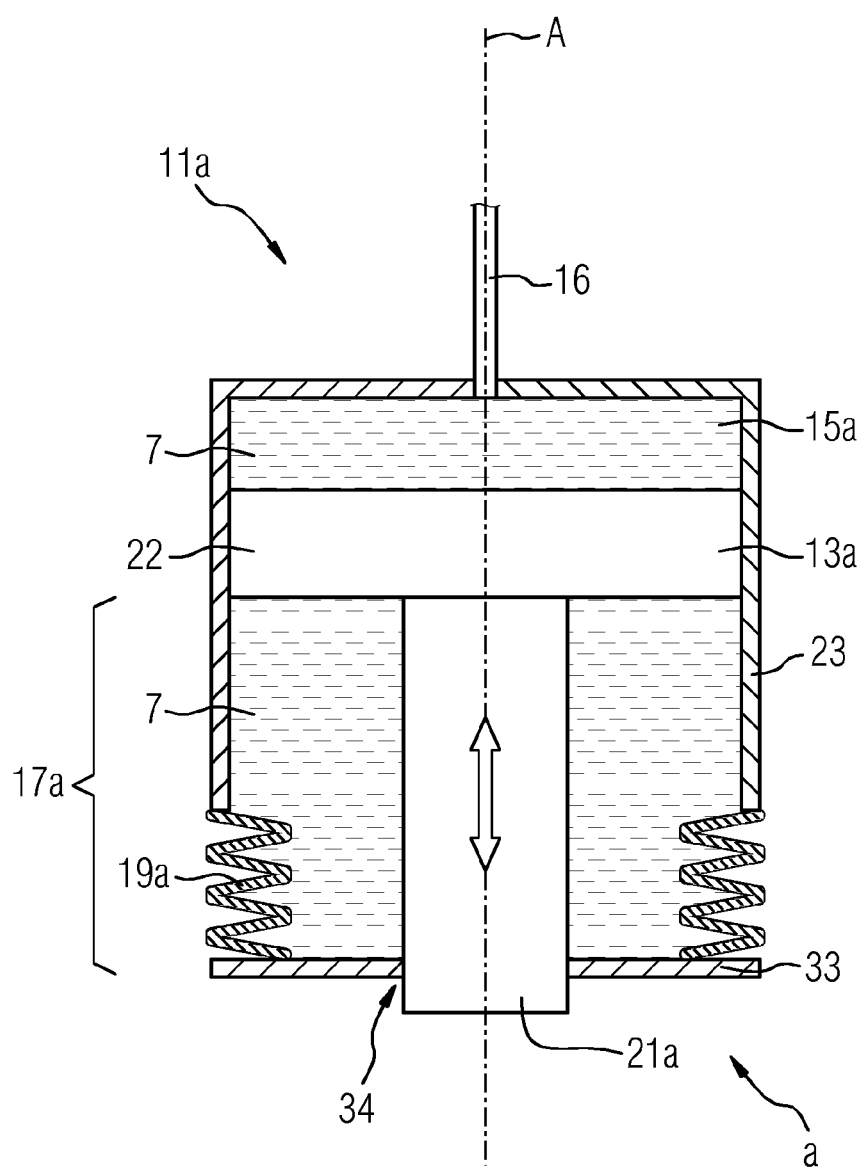
FIG. 5 shows a detailed view of the actuator device of FIG. 4.

FIG. 5 shows a detailed view of the actuator device of FIG. 4 in the region of the drive chamber 11a to clarify the configuration according to the invention with the flexibly encapsulated rear-side chamber 17a in more detail. The first piston 13a is subdivided into a piston body 22 and a piston pin 21a. The piston pin 21a in turn forms the drive body of the transmission unit. The piston body 22 subdivides the drive chamber 11a into a working chamber 15a and a rear-side chamber 17a such that the volume of the working chamber 15a varies upon a movement of the piston. The volume of the rear-side chamber 17a would also vary with a rigid configuration of the lateral bounding wall. In the configuration according to the invention, however, the lateral bounding wall is subdivided into a straight cylinder wall 23 (in the region of the piston body) and into a laterally delimiting bellows element 19a (in the part of the rear-side chamber facing away from the piston body). This bellows element 19a is flexible such that it is variable in its axial length. Upon a variation of the axial length, the cross-sectional area of the bellows element should vary as little as possible. On the side facing away from the piston body 22, the bellows element 19a is connected to an end plate 33. This end plate 33 is in turn connected to the piston pin 21a, which is passed through it. This connection 34 between piston pin 21a and end plate 33 is designed such that it is fluid-tight on the one hand and that the two elements cannot be moved against each other in axial direction on the other hand. By this rigid connection, it is achieved that the bellows element 19 is extended upon a downward movement of the piston and is compressed upon an upward movement of the piston. This axial length compensation results in the described volumetric compensation of the rear-side chamber 17a upon a movement of the piston.

Figure 6:
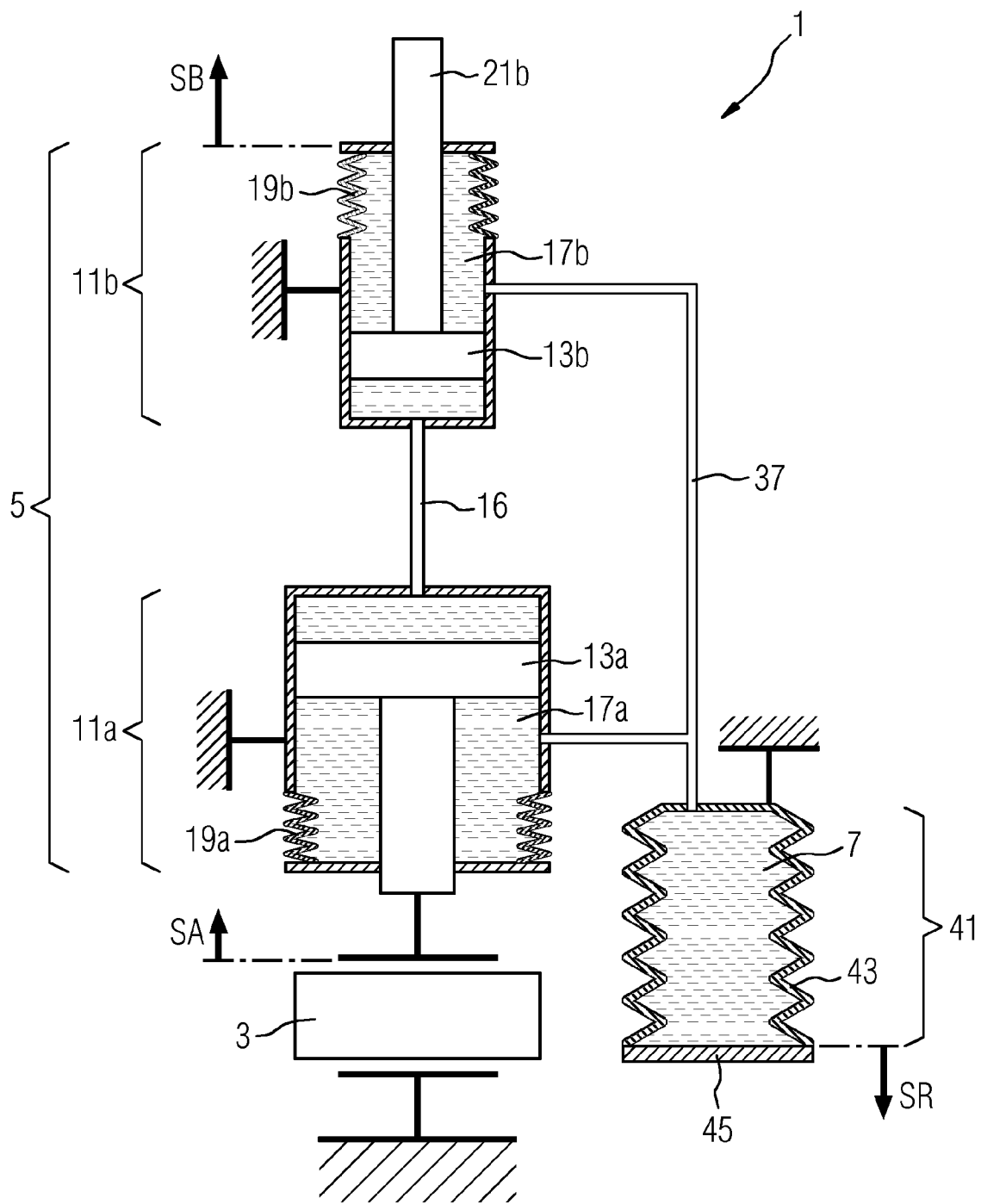
FIG. 6 shows a schematic representation of an actuator device according to a second embodiment of the invention.

If the hydraulic area of the bellows element 19a is sufficiently well adapted to the hydraulic area of the cylinder wall 23 (wherein the area of the pin 21a is respectively hydraulically not effective) and if the purely axial flexibility of the bellows element is sufficiently high at the same time, further measures for volumetric compensation of the rear-side chamber can be omitted. However, further measures for volumetric compensation can also be taken as it is illustrated in FIG. 6 for a further embodiment: FIG. 6 shows an actuator device 1, the hydraulic transmission unit 5 of which is configured substantially similarly as in the example of FIG. 4. Here, the representation of the mechanical masses 20 has partially been omitted for the sake of clarity. In contrast to FIG. 5, however, the two rear-side chambers 17a and 17b are here fluidically coupled to a reservoir chamber 41 by an additional line 37, which is also filled with the hydraulic fluid 7. This reservoir chamber too is delimited by a bellows element 43 towards the outside such that the volume of the reservoir chamber is variable. On the side of the bellows element 43 facing away from the line 37, a cover plate 45 is here arranged, with the aid of which the stroke SR can also be adjusted at the reservoir chamber. By this configuration, it is achieved that the reservoir chamber cannot only compensate for undesired volumetric variations of the rear-side chamber, but that it also can be specifically used for preloading the system. Thus, the reservoir chamber 41 can be applied with a pressure by adjusting a preset stroke position SR in the region of the cover plate 45. If the output body 21b is applied with a corresponding counterforce at the same time, it can be effected by this preadjusted pressure that the output body 21b can be preadjusted to a certain preset stroke position SA. A counterforce on the output body 21b can in turn be adjusted for example via an additional spring or else via the stiffness of the bellows 19b.

The axially movable arrangement of the piston 13a within the cylinder wall 23 can be configured similarly as in the detailed view of FIG. 2, however here without the additional sealing elements drawn there. Thus, a piston gap with uniform gap width g in particular is to be present in the configuration according to the invention. Hydraulic fluid can leak from the working chamber 15a into the encapsulated rear-side chamber 17a through the piston gap, but not into the outer environment. Thus, the hydraulic transmission unit can overall be fluid-tightly designed.

FIG. 7 shows a schematic representation of an actuator device according to a further embodiment of the invention. The actuator device of FIG. 7 comprises two partial systems configured symmetrically to each other, which each can be configured similarly as in the example of FIG. 6. Thus, the actuator device 1 comprises two individual actuators 3, which act mechanically parallel with each other. These two actuators 3 are each mechanically connected in series with an associated hydraulic transmission unit. In the shown example, the individual hydraulic transmission units are not fluidically coupled to each other. Alternatively, however, they could principally also be fluidically coupled, for example via a coupling of the two reservoir chambers 41 or else by a configuration with a common reservoir chamber. Here, the two partial systems 71 and 72 of the actuator device are mechanically connected in parallel. The two output bodies 21b are configured such that by simultaneous and equally directed control of the two actuators, an equally directed stroke SB is generated at the two output bodies 21b at the same time. In the example of FIG. 7, the two output bodies 21b are commonly coupled to a superordinated output element 75. Thus, it can be achieved that for the movement of the superordinated output element 75, an approximately doubled mechanical energy is available compared to the movement of the individual output bodies 21b.

The invention claimed is:

1. An actuator device comprising:
an actuator; and
a hydraulic transmission unit mechanically connected in series to the actuator, which hydraulic transmission unit can be filled with hydraulic fluid, comprising:
a first and a second chamber, which are hydraulically connected to each other and of which the first chamber is formed as a drive chamber and the second chamber is formed as an output chamber, the first chamber being coupled to the actuator,
wherein a first piston is arranged movably along a piston axis at least in the first chamber such that this first piston separates the first chamber into a variable-volume first working chamber and a first rear-side chamber,
wherein the first rear-side chamber is defined, at least in part, by a first lateral bounding wall that is subdivided into a first straight cylinder wall portion that axially transitions into a laterally delimiting first bellows element with variable axial length, the first straight cylinder wall portion and first bellows element collectively defining an outer boundary of the first rear-side chamber,
wherein a second piston is arranged movably along a piston axis in the second chamber such that this second piston separates the second chamber into a variable-volume second working chamber and a second rear-side chamber;
wherein the actuator device additionally comprises a reservoir chamber for the hydraulic fluid, which is fluidically coupled and/or capable of being fluidically coupled to at least one rear-side chamber;
wherein the actuator device further comprises a hydraulic line fluidically coupling the variable-volume first working chamber to the variable-volume second working chamber, the reservoir chamber being separate from the hydraulic line.

2. The actuator device according to claim 1, wherein the first piston comprises a piston body and a piston pin, and wherein the piston pin protrudes through, and is fixedly connected to, an end plate of the first rear-side chamber.

3. The actuator device according to claim 1, in which the first chamber is configured such that upon a movement of the first piston along the piston axis, a volume compensation is effected by the first bellows element for a volume of the first rear-side chamber.

4. The actuator device according to claim 1, in which each rear-side chamber is fluid-tightly encapsulated against an outer environment.

5. The actuator device according to claim 1, in which the first bellows element is formed as a corrugated bellows and/or as a diaphragm bellows.

6. The actuator device according to claim 1, wherein the first piston is arranged axially movably in relation to the first straight cylinder wall portion, and wherein a gap with a gap width below 10 µm is formed between the first straight cylinder wall portion and the first piston.

7. The actuator device according to claim 1, which is filled with a hydraulic fluid.

8. The actuator device according to claim 1, in which the reservoir chamber can be applied with pressure.

9. The actuator device according to claim 1, which is formed to transfer a movement of a drive body arranged in the region of the drive chamber to an output body arranged in the region of the output chamber with a transmission ratio of 1:2 or less.

10. The actuator device according to claim 1, which is formed to transfer a movement of a drive body arranged in the region of the drive chamber to an output body arranged in the region of the output chamber with a transmission ratio of at least 2.

11. The actuator device according to claim 1, wherein the second rear-side chamber is defined, at least in part, by a second lateral bounding wall that is subdivided into a second straight cylinder wall portion that axially transitions into a laterally delimiting second bellows element with variable axial length, the second straight cylinder wall portion and second bellows element collectively defining an outer boundary of the second rear-side chamber.

12. The actuator device according to claim 1, which comprises two partial systems, wherein each partial system comprises an actuator and a hydraulic transmission unit mechanically connected in series with the actuator, wherein the two transmission units can be mechanically coupled to a common superordinated output element in the region of their respective output chambers, such that a simultaneous control of the two actuators results in a common movement of the superordinated output element by the two hydraulic transmission units.

13. The actuator device of claim 1, wherein the first working chamber defines a first fixed volume when the first piston is in a first position and defines a second fixed volume when the first piston is in a second position.

14. The actuator device of claim 1, wherein the first working chamber is defined, at least in part, by the first straight cylinder wall and not by a bellows element with variable axial length.

15. The actuator device of claim 1, wherein the first working chamber is hydraulically connected to the second working chamber.

16. The actuator device of claim 1, wherein the first lateral bounding wall defines an outermost lateral boundary of the first chamber.

17. The actuator device of claim 1, wherein the reservoir chamber comprises a separate bellows element such that a volume of the reservoir chamber is variable.

* * * * *